(12) United States Patent
Oleske et al.

(10) Patent No.: US 6,265,335 B1
(45) Date of Patent: Jul. 24, 2001

(54) MINERAL WOOL COMPOSITION WITH ENHANCED BIOSOLUBILITY AND THERMOSTABILTY

(75) Inventors: Peter J. Oleske, Lancaster, PA (US); Pierre Brun, Chapelle d'Huin (FR)

(73) Assignee: Armstrong World Industries, Inc., Lancaster, PA (US)

( * ) Notice: Subject to any disclaimer, the term of this patent is extended or adjusted under 35 U.S.C. 154(b) by 0 days.

(21) Appl. No.: 09/273,370

(22) Filed: Mar. 22, 1999

(51) Int. Cl.$^7$ ...................................................... C03C 13/06
(52) U.S. Cl. ................................................. 501/36; 501/35
(58) Field of Search .......................................... 501/35, 36

(56) References Cited

U.S. PATENT DOCUMENTS

| | | |
|---|---|---|
| 2,664,359 | 12/1953 | Dingledy . |
| 3,736,162 | 5/1973 | Clavlovsky et al. . |
| 4,365,984 | 12/1982 | Gee . |
| 4,461,840 * | 7/1984 | Massol et al. .......................... 501/36 |
| 4,595,638 * | 6/1986 | Dohnomoto et al. ................. 428/614 |
| 4,601,956 * | 7/1986 | Dohnomoto .......................... 428/614 |
| 4,615,733 * | 10/1986 | Kubo et al. ............................. 75/229 |
| 4,664,704 * | 5/1987 | Dohnomoto et al. .................. 75/229 |
| 5,250,488 | 10/1993 | Thelohan et al. . |
| 5,554,324 | 9/1996 | Bernard et al. . |
| 5,932,500 * | 8/1999 | Jensen et al. ........................... 501/36 |
| 5,935,886 * | 8/1999 | Jensen et al. ........................... 501/36 |
| 6,037,284 | 3/2000 | Holstein et al. ....................... 501/35 |
| 6,043,170 | 3/2000 | Steinkopf et al. ..................... 501/36 |

FOREIGN PATENT DOCUMENTS

| | | |
|---|---|---|
| 0 791 087 B1 | 8/1998 | (EP) . |
| 0 790 962 B1 | 11/1998 | (EP) . |
| 56-5352 * | 1/1981 | (JP) . |
| PCT/DK89/00205 | 3/1990 | (WO) . |
| PCT/EP95/04395 | 5/1996 | (WO) . |
| PCT/EP97/01023 | 9/1997 | (WO) . |

OTHER PUBLICATIONS

Molloy, S.M., and Calhoun, W.A.; Raw Materials for the Mineral–Wool Industry; Bureau of Mines Report; Report of Investigation #4821; Oct. 1951; 8 pages; Where paper was published is omitted.

Lathe, F. E.; Compositions Suitable for Mineral Wool; Paper; Publication Date was prior to the date this application was filed; 13 pages; vol. Issue No. is omitted; Publisher and country of publisher are omitted.

\* cited by examiner

*Primary Examiner*—Karl Group
(74) *Attorney, Agent, or Firm*—Adams, Schwartz & Ewans, P.A.

(57) ABSTRACT

A mineral fiber composition having enhanced biosolubility characteristics, comprising by percentage weight:

| | |
|---|---|
| $Al_2O_3$ | 16 to 25 |
| CaO | >29 |
| $SiO_2$ | 30 to 40 |
| MgO | <15 |
| Iron | <5, selected from the group consisting of Fe, FeO and $Fe_2O_3$ |
| $K_2O$ | <4 |
| $P_2O_5$ | <0.8 |

The Kdis of the mineral fiber composition is in the range of greater than 1000 (ng/cm$^2$ * hr) at pH 4.5.

8 Claims, No Drawings

MINERAL WOOL COMPOSITION WITH ENHANCED BIOSOLUBILITY AND THERMOSTABILTY

TECHNICAL FIELD AND BACKGROUND OF THE INVENTION

This invention relates to a formulation of mineral fibers suitable as acoustical and thermal insulation. One useful application of the mineral fiber formulation in accordance with preferred embodiments of the invention is in the fabrication of acoustical ceiling boards. The material is also suitable for use as loose fill insulation in, for example, attics and walls.

The mineral fibers must be stable enough to withstand the processing involved in making the thermal and acoustical insulation products, and yet still exhibit acceptable levels of solubility in biological systems.

The mineral fibers according to the embodiments of the invention disclosed in this application are produced principally from slag. Slag is a non-metallic vitreous material consisting primarily of silicates and alumino-silicates of lime, magnesia, and other bases. The four principal oxides of typical slags are CaO (25–50% by weight), $SiO_2$ (25–50% by weight), MgO (2–25% by weight) and $Al_2O_3$ (5–20% by weight). Unless otherwise specified, percentages used throughout this specification are percent by weight. Slag is formed as a byproduct from metal extraction operations, and may therefore be recovered from iron blast furnaces, open hearth steel furnaces, and copper, lead and precious metal smelters. Slag is generally viewed as a waste stream with little utility and thus as a commodity with a relatively low value. It can therefore provide a very cost-effective raw material resource if economically processable into a commercially viable product.

Slag has proven useful in the production of certain man-made vitreous fibers, sometimes called "mineral wool" or more specifically "slag wool." These terms are used interchangeably in this application and refer to the matted, wool-like fibrous appearance of the product. Man-made mineral fibers are made by melting a suitable slag-based composition to form a "melt" and then blowing or spinning the molten material with sufficient energy to cause it to be mechanically transformed into fibers. The technology and knowledge base for such fiber production is well established. Records indicate the production of slag wool as early as the 1840's in Wales, and 1873 in the United States.

In a standard mineral wool fiber, alumina and silica form the principal mechanical strength and attachment elements. The other elements act as fluxes affecting the melt temperature and viscosity profile of the formula. When the viscosity of the material is low and the melt flow rate is too high the fibers will be thin and excessively large portions of the material will fail to form fibers. Instead, some of the melt forms clumps or balls of vitreous material, sometimes referred to as "shot." If the melt viscosity of the molten material is too high, then the resultant fibers will be thick and brittle and in addition there will be too high a proportion of shot.

Both theoretical and empirical research have determined that certain materials have an effect on the properties of mineral wool, and that varying the percentages of certain materials in particular ways can effect the processing parameters and properties of the end product in either a beneficial or detrimental manner.

For example, Calcium Oxide (CaO) decreases the viscosity of the melt, and increases the slope of the temperature viscosity curve. An increase in the slope of the temperature viscosity curve is detrimental to the properties of the end product. Generally, the slope of the temperature viscosity curve should be relatively flat. If viscosity rises too quickly with temperature, then the process control is difficult to achieve.

Aluminum Oxide ($Al_2O_3$) increases the viscosity of the melt, and beneficially decreases the slope of the temperature viscosity curve. Fiber ductility is also improved.

Magnesium Oxide (MgO) also increases the viscosity of the melt, and beneficially decreases the slope of the temperature viscosity curve.

Iron (III) Oxide ($Fe_2O_3$) decreases melt viscosity.

Silicon Dioxide ($SiO_2$) increases viscosity of the melt. It is added to balance the formula and vary the solidification point of the fibers.

The approximate composition by weight of the four principal oxides that make up most commercially available slag wool fibers are:

| | |
|---|---|
| Silicon Dioxide ($SiO_2$) | 38–45% |
| Calcium Oxide (CaO) | 28–38% |
| Aluminum Oxide ($Al_2O_3$) | 9–14% |
| Magnesium Oxide (MgO) | 2–12% |

To achieve a suitable viscosity for good fiber formation $SiO_2$, often in the form of gravel or sandstone, is compounded with the slag. A measurement often used to evaluate a molten mineral wool-forming composition is its "A/B Ratio." "A" is the sum of the $SiO_2$ percentage and the $Al_2O_3$ percentage. "B" is the sum of the CaO percentage and the MgO percentage. Slag wool fibers with an A/B ratio of 1.0 (i.e., equal percentages of A and B) have performed well in some biosolubility tests, and not well in others. An A/B ratio of 1.0, however, is quite low, and the viscosity of melts having such A/B ratios tends to be too low to achieve good fiber yields with car-type spinning systems. Slag wool with A/B ratios in the range of 1.2 to 1.4 are more typical, and these have not performed well in biosolubility tests.

Some other types of mineral fibers produced from raw materials other than slag have been shown to be thermostable and suitable for producing acoustical ceiling board products, and have performed well in biosolubility tests. These fibers are typically formulated such that they either have very low $Al_2O_3$ percentages (<4% by weight) or very high $Al_2O_3$ percentages (>18% by weight) and low CaO percentage (<29% by weight). These formulations cannot be readily achieved using slag as a base material due to the inherent chemical composition of slag.

Biosolubility is generally considered a beneficial quality in products such as mineral wool. Biosolubility does not refer to complete dissolution of the fibers within a biological system. Rather, biosolubility refers to the ability of a biological organism to attack, weaken and ultimately eject the fiber from the body. Any type of fiber of a certain size can become trapped in the lung as a result of inhalation of air-entrained fibers. These fibers are detected as foreign to the organism and attacked by lung fluid (which has a pH of about 7.4) and also by macrophages. Macrophages are an important part of the body's defense mechanism. Macrophages are large phagocytic cells found in the spleen, lymph nodes, liver and many other body tissues. They develop from monocytes and are characterized by a horseshoe-shaped nucleus and nongranular cytoplasm. Macrophages have an internal pH of about 4.5. If the macrophages are smaller than the fiber, several of the macrophages collectively engulf a fiber. The macrophage and lung fluids chemically attack the fiber, weakening it. The fiber can then be broken into pieces which are carried away by the macrophages. The macrophages migrate to the trachea where they are trapped in mucous and ejected from the body by being coughed-up in phlegm, or by being swallowed and eliminated through the digestive tract. Biosolubility may be evaluated via animal tests such as those described in EU Directive 97/69/EC or by in-vitro testing in simulated biological fluids, such as a 4.5 pH Gamble's solution. In general, to pass the EU Directive 97/69/EC tests requires a solubility greater than 1000 Kdis (measured in $ng/cm^2 * hr$).

The invention according to this application results from a novel appreciation and application of the interrelationships between several of the constituent parts of slag, and how those constituent parts can be manipulated to produce a mineral wool which has desirable and commercially valuable properties while also having a relatively high degree of biosolubility.

SUMMARY OF THE INVENTION

Therefore, it is an object of the invention to provide a mineral wool composition which has enhanced biosolubility.

It is another object of the invention to provide a mineral wool composition which has enhanced thermostability.

It is another object of the invention to provide a mineral wool composition which has properties which render it suitable for use in acoustical and thermal insulation products.

It is another object of the invention to provide a mineral wool composition which is inexpensive to produce.

It is another object of the invention to provide a slag-based precursor for producing a mineral wool composition which achieves the foregoing objects.

The practice of the invention involves the formulation of compounds which are based on low cost slag and which are useful in the preparation of thermostable mineral fibers that also display good biosolubility. Simultaneous thermostability and biosolubility are achieved by adding alumina in specified amounts to the slag. The alumina acts to raise the viscosity of the molten compound, allowing it to be readily processed into fibers with yields and properties similar to that achieved with conventional slag-based compounds. The high alumina levels in combination with levels of CaO of >29% allows for the production of fibers which are highly soluble in biological fluids at a lower cost than can be produced using non-slag based systems. Although other systems based on mined raw materials have shown good biosolubility, these compositions are more expensive to produce due to the greater raw material cost and energy requirements.

These and other objects of the present invention are achieved in the preferred embodiments disclosed below by providing a mineral fiber composition having enhanced biosolubility, comprising by percentage weight:

| | |
|---|---|
| $Al_2O_3$ | 16 to 25 |
| CaO | >29 |
| $SiO_2$ | 30 to 40 |
| MgO | <15 |
| Iron | <5, selected from the group |

-continued

| | |
|---|---|
| | consisting of Fe, FeO and $Fe_2O_3$ |
| $K_2O$ | <4 |
| $P_2O_5$ | <0.8 |

Preferably, the biolsolubility of the mineral fiber composition has a Kdis greater than 1000 ($ng/cm^2 * hr$).

Determining the dissolution rate for these man made vitreous fibers was accomplished by first putting the size-characterized fiber sample between two filter membranes of a flow cell. A modified (pH adjusted to 4.5) Gamble's solution is contacted with the fibers. A mass loss for the fibers is obtained by an analysis of the $SiO_2$ and $Al_2O_3$ content of the eluate. The dissolution velocity is calculated from the mass loss and the diameter distribution of the sample. The units of measure are nano-grams per centimeter square per hour ($ng/cm^2 * hr$).

According to one preferred embodiment of the invention, the percentage by weight of $Al_2O_3$ is between 17 and 25.

According to another preferred embodiment of the invention, the percentage by weight of $Al_2O_3$ is between 19 and 22.

According to yet another preferred embodiment of the invention, the percentage by weight of CaO is at least 30.

According to yet another preferred embodiment of the invention, the percentage by weight of CaO is at least 31.

According to yet another preferred embodiment of the invention, the percentage by weight of CaO+MgO is greater than the percentage by weight of $SiO_2$.

According to yet another preferred embodiment of the invention, the weight of $Al_2O_3$ and $SiO_2$ is less than 60 percent of the total weight of the mineral wool composition.

According to yet another preferred embodiment of the invention, the weight of $Al_2O_3$ and $SiO_2$ is less than 55 percent of the total weight of the mineral wool composition.

According to yet another preferred embodiment of the invention, a slag-based precursor is provided for the manufacture of a mineral wool composition having enhanced biosolubility and thermostability. The slag-based precursor comprises slag, bauxite, silica-rich rock and an energy source, wherein the mineral wool composition produced from the precursor comprises by percentage weight the values according to the preferred embodiments of the resulting mineral wool compositions described in this application. The energy source may be coke or electricity.

DESCRIPTION OF THE PREFERRED EMBODIMENT AND BEST MODE

Development of mineral wool products according to the invention resulted in part from research observations which support the theory that high levels of combined basic oxides such as CaO, MgO, $Na_2O$ and $K_2O$ cause the fibers to display a rapid initial dissolution. If the slag compound from which the mineral fibers are produced is too basic, the melt viscosity will likely be quite low, making it difficult to spin fibers of sufficient diameter and durability to be useful in the manufacture of thermal and acoustical insulation products such as ceiling boards. $SiO_2$ is often used as a viscosity modifier in slag wool processing. It raises the melt viscosity of the molten compound and allows for a melt that is more readily spun into thicker fibers more suitable for use in producing thermal and acoustical insulation products such as ceiling boards. Silica has also been shown to have a negative effect on the biosolubility of fibers, and thus higher $SiO_2$ levels typically correlate to lower biosolubility.

Increasing the $Al_2O_3$ concentration raises the melt viscosity of the molten slag-based compositions. The $SiO_2$ level of such compounds may be reduced, while still maintaining a viscosity that is suitable for good man made mineral fiber spinning. $Al_2O_3$ is amphoteric. At its typical concentration (<14%) in mineral wool fibers it acts as an acidic oxide. At higher concentrations it displays the properties of a basic oxide.

$Fe_2O_3$ may also affect the fiber morphology in a similar manner to $Al_2O_3$ such that the sum of these two oxides appears to be a significant contributing factor in the level of fiber biosolubility. Higher levels of iron, however, tend to have a negative effect on the fiber formation process by causing the viscosity of the melt to be lower, thus making spinning of fibers more difficult. If the $SiO_2$ levels are to be kept low, then the total iron level must also be controlled, typically at <5% by weight.

Previous patents and other disclosures have shown the effect of both very high and very low compositional concentrations of $Al_2O_3$ on fiber biosolubility. Suitable biosoluble compositions that are also comprised of very high (>29% by weight) CaO levels have not heretofore been achieved.

Applicants have now achieved compositions disclosed herein with >29% CaO in combination with high levels of $Al_2O_3$. The resultant fibers exhibit good biosolubility and thereby allow for the use of slag as a raw material source.

It has been discovered that by adding $Al_2O_3$ to slag-based compositions, specific fibers with suitable properties can be created far more effectively than by other currently known means. The most cost-effective means to this end to date utilizes slag, bauxite, and gravel as the constituent ingredients for these compositions.

Two preferred embodiments of the invention are shown in Tables 1 and 2.

TABLE 1

|  | Bauxite | Slag | Gravel | Fiber |
|---|---|---|---|---|
| Recipe (Kg) | 130 | 820 | 50 |  |
| OXIDE (Wt. %) |  |  |  |  |
| $SiO_2$ | 13 | 32 | 99 | 34.1 |
| Fe | 5 | 0.5 |  | 1.2 |
| $Al_2O_3$ | 63 | 14 |  | 20.4 |
| $TiO_2$ | 2.5 |  |  | 1.0 |
| CaO | 1.5 | 44 |  | 36.8 |
| $P_2O_5$ |  |  |  | 0.2 |
| MnO |  | 2 |  | 1.7 |
| MgO |  | 4 |  | 3.4 |
| $K_2O$ |  |  |  | 0.4 |
| $Na_2O$ |  |  |  | 0.2 |
| S |  | .4 |  | 0.2 |

TABLE 2

|  | Bauxite | Slag | Gravel | Fiber |
|---|---|---|---|---|
| Recipe (Kg) | 170 | 750 | 80 |  |
| OXIDE (Wt. %) |  |  |  |  |
| $SiO_2$ | 13 | 32 | 99 | 36.6 |

TABLE 2-continued

|  | Bauxite | Slag | Gravel | Fiber |
|---|---|---|---|---|
| Fe | 5 | 0.5 |  | 1.7 |
| $Al_2O_3$ | 63 | 14 |  | 20.7 |
| TiO2 | 2.5 |  |  | 1.0 |
| CaO | 1.5 | 44 |  | 33.7 |
| $P_2O_5$ |  |  |  | 0.2 |
| MnO |  | 2 |  | 1.7 |
| MgO |  | 4 |  | 3.5 |
| $K_2O$ |  |  |  | 0.4 |
| $Na_2O$ |  |  |  | 0.2 |
| S |  | .4 |  | <0.2 |

The mineral wools produced in accordance with Tables 1 and 2 have a relatively low silica content which reduces required energy input, and a relatively low iron content which produces a light green/gray color suitable for the manufacture of white or other light-colored acoustic ceiling tiles.

Somewhat less satisfactory embodiments of the mineral wool product are shown in Tables 3 and 4.

TABLE 3

|  | Bauxite II | Slag | Gravel | Fiber |
|---|---|---|---|---|
| Recipe (Kg) | 200 | 750 | 50 |  |
| OXIDE (Wt. %) |  |  |  |  |
| $SiO_2$ | 10 | 32 | 99 | 33.7 |
| Fe | 25 | 0.5 |  | 3.5 |
| $Al_2O_3$ | 50 | 14 |  | 21 |
| $TiO_2$ | 2.5 |  |  | 1.0 |
| CaO | 0.2 | 44 |  | 34.2 |
| $P_2O_5$ |  |  |  | 0.2 |
| MnO |  | 2 |  | 1.6 |
| MgO | 0.2 | 4 |  | 3.2 |
| $K_2O$ |  |  |  | 0.4 |
| $Na_2O$ |  |  |  | 0.2 |
| S |  | .4 |  | 0.2 |

TABLE 4

|  | Weight Percentages | | | |
|---|---|---|---|---|
|  | Bauxite II | Slag | Gravel | Fiber |
| Recipe (Kg) | 180 | 800 | 20 |  |
| OXIDE (Wt. %) |  |  |  |  |
| $SiO_2$ | 8.2 | 36.3 | 95.5 | 34.2 |
| Fe | 19.9 | 0.4 |  | 3.8 |
| $Al_2O_3$ | 55.7 | 11.5 |  | 20.6 |
| $TiO_2$ | 3.0 |  |  | 1.3 |
| CaO | 0.2 | 35 |  | 29.1 |
| $P_2O_5$ | 0.05 |  |  | 0.03 |
| MnO | 0.02 | 0.3 |  | 0.7 |
| MgO | 0.2 | 13 |  | 8.6 |
| $K_2O$ | 0.3 |  |  | 0.5 |
| $Na_2O$ | 0.5 |  |  | 0.4 |
| S |  | .4 |  |  |

The mineral wools according to Tables 3 and 4 possess satisfactory biosolubility and thermostability, but the relatively high percentage of iron causes the products to have a deep chocolate brown color which creates difficulties in producing a light-colored product, such as a ceiling tile but is suitable for applications where a dark color is preferred or where color is not a consideration.

The mineral wool products according to Tables 1, 2, 3 and 4 are produced by charging a conventional cupula with slag, gravel, bauxite and coke. The material is heated with a combination of oxygen and heated air to a temperature of between 1450 to 1480 degrees C. The material forms a molten mass in the bottom of the cupula and is drawn off through a side opening. The molten material is gravity-fed onto a car-type spinning apparatus. As the molten material flows out of the cupula, material higher in the cupula moves downwardly forming additional molten material. The process is a continuous one. Thus, as the level of the slag-based material in the cupula drops, additional slag, gravel, bauxite and coke is added into the top of the cupula in the required percentages. The material is preferably in relatively small fist-to-thumb-sized chunks. Smallerpieces pack too closely together and retard movement of super-heated air and oxygen through the mass as necessary for even heat distribution. Larger pieces have insufficient overall surface area necessary for efficient heat transfer into the mass of the material. While it is desirable to charge the cupula with a mixture of the materials, they can also be added in layers, since the melting process tends to mix the materials.

In each case, approximately 140 to 170 Kg of coke is used per 1000 kg of meltable stone, and is added along with the other materials as the cupula is recharged.

For cost control reasons the percentage of $Al_2O_3$ should be kept to <23%. Added $Al_2O_3$ would be expected to only marginally improve solubility, but would also raise raw material and energy requirement costs. The combined percentage of CaO+MgO should be greater then $SiO_2$ and should fall between 37 and 45%. Lower percentages decrease biosolubility, and the higher percentages reduce melt viscosity and thereby create fiber-forming difficulties. The combined $Al_2O_3$ and $SiO_2$ percentages should be less than 60% of the total weight, preferably less then 55%.

The car-type spinning apparatus comprises a series of rapidly rotating rotors which impart centrifugal mechanical energy to the molten material sufficient to cause it to be formed into fibers as it is thrown off of the rotating surface of the rotors. This fiber-forming process is conventional in the art. The rotational speed of the rotors ranges between 2900 rpm for the first rotor to 6400 for the last rotor in a four rotor system and affects the diameter of the fibers thus produced. Optimum fiber diameter is in the range of 3 to 7 microns, with diameters in the general range of 7 microns being an upper limit for fibers with satisfactory processing properties.

Biosolubility was determined utilizing test methodologies developed at the Fraunhofer Institute, as shown below in Table 5.

TABLE 5

| OXIDE (wt. %) | Comparative Sample #1 | Comparative Sample #2 | Comparative Sample #3 | Comparative Sample #4 | Sample of Table 2 |
|---|---|---|---|---|---|
| $SiO_2$ | 41.6 | 39.6 | 36.1 | 38.8 | 36.6 |
| Fe | 0.6 | 0.6 | 0.74 | | 1.7 |
| $Al_2O_3$ | 12.5 | 10.1 | 13.3 | 22.1 | 20.7 |
| $TiO_2$ | 0.5 | 0.6 | 0.5 | 2.0 | 1.0 |
| CaO | 36.5 | 30.4 | 39.4 | 14.7 | 33.7 |
| $P_2O_5$ | 0.2 | 0.01 | 0.2 | | 0.2 |
| MnO | 1.4 | 0.75 | 1.9 | | 1.7 |
| MgO | 4.8 | 13.9 | 3.9 | 10.6 | 3.5 |
| $K_2O$ | 0.4 | 0.8 | 0.5 | 0.8 | 0.4 |
| $Na_2O$ | 0.3 | 0.6 | 0.9 | 1.8 | 0.2 |
| S | 0.95 | 1.5 | 1.4 | | <0.1 |
| Kdis (pH 4.5) (ng/cm$^2$ * hr) | 375 | 302 | 667 | 930 | 1407 |

According to Table 5, the biosolubility of the Sample of Table 2 is significantly improved over comparative samples. Note particularly the comparison with Comparative Sample No. 4 (a rock wool) and its biosolubility of 930 Kdis. Comparative Sample No. 4 was made in accordance with the disclosure of European Patent Specification EP 0 790 962.

The correlation between Kdis and the animal tests of EU directive 97/69/EC have been previously published.

Thermostability is demonstrated by fire-testing ceiling boards made from the mineral wool according to the invention. Tests utilizing ASTM E 119 all indicated a sag of 10–20 mm—an acceptable range of values indicating adequate resistance to fire.

A mineral wool composition is described above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

What is claimed is:

1. A mineral fiber having enhanced thermostability and biosolubility comprising by percentage weight:

| | |
|---|---|
| $Al_2O_3$ | 16 to 25 |
| CaO | >33 |
| $SiO_2$ | ≧30 and <35 |
| MgO | <15 |
| Iron | <5 |
| $K_2O$ | <4 |
| $P_2O_5$ | <0.8, | wherein said Iron is the total of Fe, FeO, and $Fe_2O_3$.

2. A mineral fiber according to claim 1, wherein the percentage by weight of $Al_2O_3$ is between 17 and 25.

3. A mineral fiber according to claim 1, wherein the percentage by weight of $Al_2O_3$ is between 19 and 22.

4. A mineral fiber according to claim 1, wherein the percentage by weight of CaO+MgO is greater than the percentage by weight of $SiO_2$.

5. A mineral fiber according to claim 1, wherein the weight of $Al_2O_3$ and $SiO_2$ is less than 60 percent of the total weight of the mineral wool composition.

6. A mineral fiber according to claim 1, wherein the weight of $Al_2O_3$ and $SiO_2$ is less than 55 percent of the total weight of the mineral wool composition.

7. A mineral fiber according to claim 1,2,3,4,5, or 6, wherein the biolsolubility of the mineral fiber composition is greater than 1000 ng/cm$^2$ * hr at a pH of 4.5.

8. A mineral fiber having enhanced thermostability and biosolubility comprising by percentage weight:

| | |
|---|---|
| $Al_2O_3$ | >20 and ≦25 |
| CaO | >33 |
| $SiO_2$ | 30 to 40 |
| MgO | <15 |
| Iron | <5 |
| $K_2O$ | <4 |
| $P_2O_5$ | <0.8, | wherein said Iron is the total of Fe, FeO, and $Fe_2O_3$.

* * * * *